(12) United States Patent
Maier et al.

(10) Patent No.: US 12,485,533 B2
(45) Date of Patent: Dec. 2, 2025

(54) SLIDE IMAGING APPARATUS INCLUDING A ROBOTIC ARM AND A METHOD FOR IMAGING A SLIDE

(71) Applicant: Roche Molecular Systems, Inc., Pleasanton, CA (US)

(72) Inventors: Alexander Maier, Maxdorf (DE); Denny Osswald, Biblis (DE); Marc Rehberger, Ketsch (DE); Bernardo Spring De Souza, Lorsch (DE)

(73) Assignees: Roche Diagnostics GMBH, Mannheim (DE); Roche Molecular Systems, Inc., Pleasanton, CA (US)

( * ) Notice: Subject to any disclaimer, the term of this patent is extended or adjusted under 35 U.S.C. 154(b) by 478 days.

(21) Appl. No.: 17/946,771

(22) Filed: Sep. 16, 2022

(65) Prior Publication Data

US 2023/0014758 A1    Jan. 19, 2023

Related U.S. Application Data

(63) Continuation of application No. PCT/EP2021/057883, filed on Mar. 26, 2021.

(30) Foreign Application Priority Data

Mar. 27, 2020  (EP) .................................. 20166222

(51) Int. Cl.
  *B25J 9/16*   (2006.01)
  *G02B 21/34*  (2006.01)
(52) U.S. Cl.
  CPC .......... *B25J 9/1612* (2013.01); *B25J 9/1687* (2013.01); *G02B 21/34* (2013.01)

(58) Field of Classification Search
  None
  See application file for complete search history.

(56) References Cited

U.S. PATENT DOCUMENTS

| | | | |
|---|---|---|---|
| 6,118,582 A | 9/2000 | Del Buono | |
| 6,201,639 B1 * | 3/2001 | Overbeck | ............ B01L 3/0241 359/368 |
| 6,522,774 B1 | 2/2003 | Bacus et al. | |

(Continued)

FOREIGN PATENT DOCUMENTS

| | | |
|---|---|---|
| CN | 104192437 A | 12/2014 |
| EP | 0 245 089 A2 | 11/1987 |

(Continued)

OTHER PUBLICATIONS

International Search Report and Written Opinion of the International Searching Authority for corresponding International Application No. PCT/EP2021/057883, dated Jun. 25, 2021, 14 pgs.

*Primary Examiner* — Thomas D Lee
(74) *Attorney, Agent, or Firm* — Womble Bond Dickinson (US) LLP

(57) ABSTRACT

A slide imaging apparatus includes: at least one imaging device configured to generate an image of a sample mounted on a slide, wherein the imaging device comprises an operating button; a storage device loadable with a plurality of slides and configured to store the slides; and a supply device configured to supply the slides from the storage device to the imaging device, wherein the supply device is configured to press the operating button.

18 Claims, 2 Drawing Sheets

(56) References Cited

U.S. PATENT DOCUMENTS

| | | |
|---|---|---|
| 6,640,014 B1 | 10/2003 | Price et al. |
| 6,711,283 B1 | 3/2004 | Soenksen |
| 7,682,573 B1 | 3/2010 | DeBolt |
| 8,712,116 B2 | 4/2014 | Gouch |
| 9,116,035 B2 | 8/2015 | Gouch et al. |
| 2010/0258578 A1 | 10/2010 | Motadel |
| 2014/0362436 A1 | 12/2014 | Forget |
| 2016/0291308 A1 | 10/2016 | Sink et al. |
| 2018/0252621 A1 | 9/2018 | Angros |

FOREIGN PATENT DOCUMENTS

| | | | |
|---|---|---|---|
| EP | 0 534 247 B1 | 3/1993 | |
| JP | 2002-148526 A | 3/2003 | |
| JP | 2010-221357 A | 4/2012 | |
| JP | 2013-536471 A | 4/2013 | |
| JP | 2012-161876 A | 2/2014 | |
| JP | 2019-117072 A | 9/2019 | |
| WO | WO-9704347 A1 * | 2/1997 | ........... G02B 21/002 |
| WO | 2013/017855 A1 | 2/2013 | |
| WO | 2019/097523 A1 | 5/2019 | |
| WO | 2020021837 A1 | 1/2020 | |

\* cited by examiner

SLIDE IMAGING APPARATUS INCLUDING A ROBOTIC ARM AND A METHOD FOR IMAGING A SLIDE

CROSS-REFERENCE TO RELATED APPLICATION

This application is a bypass continuation application of International Application PCT/EP2021/057883, filed Mar. 26, 2021, which claims priority to and the benefit of European Patent Application No. 20 166 222.8, filed in the European Intellectual Property Office on Mar. 27, 2020, the entire content of each of which are incorporated herein by reference

BACKGROUND

1. Field

The present disclosure relates to a slide imaging apparatus and to a method for imaging a plurality of slides. Herein, the slide imaging apparatus can, preferably be used in digital pathology; however, further uses are feasible.

2. Description of the Related Art

A slide imaging apparatus comprises an imaging device which is configured to generate an image of a sample mounted on a slide. The image generated by a modern imaging device is, typically, a digital image, and such an image may, therefore, be referred to as a "digital slide". Typically, the sample mounted on the slide is a biological specimen, such as a tissue sample. Typically the slide is a glass slide. Typically, a slide imaging apparatus is used in digital pathology, which can be understood as an image-based information environment that enables management of information generated from a digital slide.

Where an imaging device is capable of generating an image which may cover a majority or a complete surface of a slide, e.g. by using a scanning process, the corresponding slide imaging apparatus may be referred to as a "whole slide imaging" apparatus. A slide imaging apparatus may use a 2D (two-dimensional) camera or a line scan detector to generate the image of a sample mounted on a slide. Examples of a slide imaging apparatus are, for example, described in EP 0 053 4247 B1, EP 0 245 089 A2, U.S. Pat. Nos. 6,118,582 A, 6,522,774 B1, 6,640,014 B1, 6,711,283 B1, 7,682,573 B1, WO 2013/017855, U.S. Pat. Nos. 8,712,116 B2 and 9,116, 035 B2.

In general, an imaging device has a capacity of processing between 1 and 1,000 slides simultaneously. Typically, a distinction can be made between an imaging device having a low throughput, which relates to a simultaneous processing of less than 10 slides, and an imaging device having a high throughput, which refers to the simultaneous processing of more than 100 slides, wherein an imaging device configured to simultaneously process 10 to 100 slides could, thus, be denoted as an imaging device having a moderate throughput. In order to charge the imaging device with one or more slides, individual slides are, typically, inserted in a manual fashion into a sliderepository, particularly selected from a slide tray or a slide rack, which is, subsequently, introduced into the imaging device for generating the desired image of a sample mounted on a slide.

However, it would be desirable to be able to insert a slide into a slide reception comprised by an imaging device in an automated fashion, in particular by using an adapted supply device. For this purpose, the supply device can be or comprise a gripping device which is, typically, designed for carrying out a specific gripping task. With respect to the disclosure herein, the specific gripping task, particularly, comprises transferring the slide to the slide reception of the imaging device in a tight fashion, thereby avoiding an instability or a loss of the slide during transport.

Further, when inserting the slides into the slide reception of the imaging device, an eject button of the imaging device has, concurrently, to be pressed, in particular, to eject a slide tray configured to hold the slide during the scanning of the slide in the imaging device. However, a robotic arm as comprised by the supply device, usually, has only a limited space within which objects can be reached by the robotic arm. As a result, the robotic arm may, in general, be able to only reach the slide reception of the imaging device but not the eject button of the imaging device although a grip radius of the robotic arm has been fully exhausted.

WO 2019/097523 A1 discloses a microscope system comprising a plurality of microscope modules, a cassette for holding a plurality of slides, a slide loader configured to move the plurality of slides between the cassette and the plurality of microscope modules, and a processor coupled to the slide loader. The processor may be configured with instructions which, when executed, cause the slide loader to move a slide into or from a selected microscope module among the plurality of microscope modules. Various other methods, systems, and computer-readable media are also disclosed.

US 2018/252621 A1 discloses a method of removing a floatation liquid from between a microscope slide and a paraffin embedded biological specimen including position the microscope slide with the paraffin embedded biological specimen floated thereon onto a slide support element. The slide support element is rotated to cause the microscope slide and the paraffin embedded biological specimen to move in a way that causes the floatation liquid disposed between the microscope slide and the paraffin embedded biological specimen to be removed from between the microscope slide and the paraffin embedded biological specimen.

Problem to be Solved

It is, therefore, desirable to provide a slide imaging apparatus and a method for imaging a plurality of slides enabling an improved processing of the slides to be processed in an imaging device, wherein the slides are provided to be introduced into a slide reception of an imaging device.

In particular, it is desirable to be able to insert the slides into a slide reception of an imaging device and to, concurrently, press an eject button of the imaging device, especially to eject a slide tray configured to hold the slide during the scanning of the slide in the imaging device.

SUMMARY

The aforementioned problem is addressed by a slide imaging apparatus and a method for imaging a plurality of slides with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Disclosed and proposed herein is a slide imaging apparatus. The term "slide" as used herein is a broad term and is to be given its ordinary and customary meaning to a person of ordinary skill in the art and is not to be limited to a special or customized meaning. The term may, specifically, refer, without limitation, to a substrate which is designated for a sample to be mounted on a surface of the slide. The term "sample" as used herein is a broad term and is to be given its ordinary and customary meaning to a person of ordinary skill in the art and is not to be limited to a special or customized meaning. The term may, specifically, refer, without limitation, to a biological specimen, such as a tissue sample. However, other kinds of samples may also be feasible.

In particular for a purpose of carrying the sample without any changes during the processing to the slide, the substrate is mechanically stable and can, therefore comprise any material which provides sufficient mechanical stability. In particular for a purpose of carrying a biological specimen, the substrate may preferably exhibit a surface which is configured to be compatible with biological material. By way of example, the slide is a glass slide since glass is known, on one hand, to provide sufficient mechanical stability and, on the other hand, to have a high compatibility with biological material. However, further kinds of materials for the slides may also be feasible.

Further, the slide may, in particular, have a form which may enable imaging of the sample mounted on the slide. The terms "imaging" or "generate an image" as used herein are broad terms and are to be given their ordinary and customary meaning to a person of ordinary skill in the art and are not to be limited to a special or customized meaning. The terms may, specifically, refer, without limitation, to providing a 2D two-dimensional representation of at least one property of the sample, also denoted by the term "image", which can typically, be processed and displayed on a screen for being regarded by eyes of a viewer, preferably, without any further aids, apart from eyeglasses of the viewer. For this purpose an imaging device as disclosed above in more detail is, typically, used.

Further, the terms "apparatus" and "slide imaging apparatus" as used herein are broad terms and are to be given their ordinary and customary meaning to a person of ordinary skill in the art and are not to be limited to a special or customized meaning. The terms may, specifically, refer, without limitation, to a device having a plurality of components as disclosed below in more detail.

In particular, the slide imaging apparatus comprises:
at least one imaging device configured to generate an image of a sample mounted on a slide, wherein the imaging device comprises at least one operating button;
a storage device loadable with a plurality of slides and configured to store the slides; and
a supply device configured to supply the slides from the storage device to the imaging device, wherein the supply device is configured to press the operating button.

Accordingly, the slide imaging apparatus comprises a storage device which is loadable with a plurality of slides and configured to store the slides. For the term "slide" reference may be made to the definition as provided above. The term "storage device" as used herein is a broad term and is to be given its ordinary and customary meaning to a person of ordinary skill in the art and is not to be limited to a special or customized meaning. The term may, specifically, refer, without limitation, to a slide repository which is designated for receiving an individual slide holder or, alternatively, more than one slide holder simultaneously, wherein each slide holder is configured to hold more than one slide. In a preferred embodiment, the storage device may comprise at least two compartments, wherein each of the compartments is configured to store a portion of the slides. Herein, the compartments may comprise at least two rows which are placed in an adjacent manner, thus, storing the slides next to one another. In particular, the storage device may be selected from a slide tray or a slide rack, however, further types of storage devices may also be feasible. However, further kinds of arrangements of the slides and/or the slide holders, respectively, in the storage device may also be feasible. Thus, the storage device may be loadable with the plurality of slides, preferably, in a manual fashion, wherein, however, an automatic loading of the storage device may also be conceivable.

The slide imaging apparatus further comprises a supply device which is configured to supply the slides from the storage device to the at least one imaging device. The term "supply device" as used herein is a broad term and is to be given its ordinary and customary meaning to a person of ordinary skill in the art and is not to be limited to a special or customized meaning. The term may, specifically, refer, without limitation, to a device which is configured to transfer the slides from the storage device to the at least one imaging device. For this purpose, the supply device may comprise a robotic arm. Herein, the term "robotic arm" as used herein is a broad term and is to be given its ordinary and customary meaning to a person of ordinary skill in the art and is not to be limited to a special or customized meaning. The term may, specifically, refer, without limitation, to a programmable mechanical unit having a form of at least one of a hand or an arm and configured to move in a similar manner as the hand or the arm, using an electrical and/or pneumatic drive, including but not limited to gripping at least one object, in particular a slide or a slide holder, and transferring it to a defined destination.

This kind of setup of the slide imaging apparatus as disclosed herein is, thus, in particular contrast to known slide imaging apparatuses, in which a single slide or a slide holder is, after being loaded with the one or more slides, subsequently introduced into the imaging device for generating the desired image of a sample mounted on the at least one slide. In the slide imaging apparatus as disclosed herein, the plurality of the slides is loaded, in contrast to known slide imaging apparatuses, into the storage device, where the slides are stored until they are supplied from the storage device to the at least one imaging device, wherein the image of a sample being mounted on the slide is generated. Herein, the supplying of the slides from the storage device to the at least one imaging device is, preferably, performed in an automated fashion. The terms "in an automated fashion" and "automatedly" as used herein are broad terms and are to be given its ordinary and customary meaning to a person of ordinary skill in the art and are not to be limited to a special or customized meaning. The terms may, specifically, refer, without limitation, to a kind of process which is performed without direct interaction of a user of the slide imaging apparatus on a basis of an algorithm configured to perform the transfer of the slides without manual performance of the user.

In general, the supply device may be configured to process the slides or the slide holders, respectively, along a predetermined routine route, for example, starting on a top row and continuing to a bottom row of the storage device. In a particular embodiment, the storage device may, further, comprise a fast lane. The term "fast lane" as used herein is a broad term and is to be given its ordinary and customary meaning to a person of ordinary skill in the art and is not to be limited to a special or customized meaning. The term may, specifically, refer, without limitation, to a partition of the storage device configured to store at least one sample mounted to a designated slide, wherein each designated slide is determined for privileged processing outside the predetermined routine route as typically used by the supply device. In this fashion, a specifically designated slide may be processed further in accordance with a particular desire of a user of the slide imaging apparatus.

In a further preferred embodiment, the supply device is configured to convey the slides, preferably after completion of a scanning process, back from the at least one imaging device to the storage device, in particular to an associated position within the storage device into which the slides have been loaded. In other words, the supply device is configured to convey the slides back from the first imaging device or the second imaging device to the same position within the storage device into which the slides had been loaded before they were transferred from the storage device selectively to the first imaging device and the second imaging device. Thus, a user of the slide imaging apparatus can receive back the slides in the same order in which they had been provided to the storage device, thus facilitating a subsequent identification and possible further processing of the slides.

As already indicted above, the slide imaging apparatus further comprises at least one imaging device, wherein the imaging device is configured to generate an image of a sample mounted on a slide. The term "imaging device" as used herein is a broad term and is to be given its ordinary and customary meaning to a person of ordinary skill in the art and is not to be limited to a special or customized meaning. The term may, specifically, refer, without limitation, to a device which is designated for generating a 2D representation of at least one visual property of the sample. In particular, the imaging device may be selected from a 2D camera or a line scan detector. However, further kinds of imaging devices may also be feasible. Consequently, the slide imaging apparatus according to the present invention may comprise one, two, three, four, five, six, or more individual imaging devices, wherein the at least one individual imaging device can be individually addressed by the supply device as disclosed below in more detail. Herein, the further imaging devices could, in particular, be maintained as a further backup option in case of failure of more than one imaging device.

For a purpose of generating the desired image of the sample, the slide may, preferably, be a plate having a 2D extension and a thickness, wherein the 2D extension of the plate may, preferably, exhibit a rectangular or circular form, and wherein the thickness of the plate may be small compared to a size of the extension, preferably 20%, more preferred 10%, in particular 5%, or less than a measure for a linear extent of the 2D extension of the plate.

Further, the at least one imaging device comprises an operating button. The term "operating button" as used herein is a broad term and is to be given its ordinary and customary meaning to a person of ordinary skill in the art and is not to be limited to a special or customized meaning. The term may, specifically, refer, without limitation, to a component of a device which is, typically, located on a surface of the corresponding device being accessible to a person or to an object and which can be pressed or released, whereby a piece of information is transmitted to the device, whereinafter the device may execute an operation. Hereby, the terms "press", "pressed" or "pressing" may, specifically, refer, without limitation, to impinging the button by a person or by an object, whereas the terms "release", "released" or "releasing" may, specifically, refer, without limitation, to removing a pressure from the button, each in a fashion that a position of the button relative to the surface of the device may be subject to a change which may exceed a predefined threshold.

As disclosed herein, the operating button of the at least one imaging device may, preferably, be or comprise an eject button. The term "eject button" as used herein is a broad term and is to be given its ordinary and customary meaning to a person of ordinary skill in the art and is not to be limited to a special or customized meaning. The term may, specifically, refer, without limitation, to a particular kind of button which may be designed to provide an object, specifically a component of the device, to a user or an object pressing the button. With particular regard to the present disclosure, the eject button is configured to eject a slide tray when the eject button is pressed. The term "slide tray" as used herein is a broad term and is to be given its ordinary and customary meaning to a person of ordinary skill in the art and is not to be limited to a special or customized meaning. The term may, specifically, refer, without limitation, to an element configured to hold at least one slide or a slide holder, in particular during the scanning of the at least one slide in the imaging device.

Accordingly, the supply device is configured to supply the slides from the storage device to the at least one imaging device, wherein the supply device is configured to press the operating button. For this purpose, the supply device may, preferably, comprise a protrusion which is configured to press the operating button. Herein, the protrusion may, specifically, be lance-shaped or finger-shaped. However, further kinds of shapes may also be feasible.

Consequently, the operating button is impinged by the protrusion at various events, which may result in an abrasion of at least one of the protrusion or the operating button. Thus, the supply device may comprise a protective cover configured to cover the protrusion. The term "protective cover" as used herein is a broad term and is to be given its ordinary and customary meaning to a person of ordinary skill in the art and is not to be limited to a special or customized meaning. The term may, specifically, refer, without limitation, to a preferably flexible object which can be arranged to separate the component to be covered from surrounding objects. Herein, a shape of the protective cover may, preferably, be formed to cover the lance-shaped or finger-shaped protrusion in a particularly tight fashion. As a result, the protective cover may, thus, be configured to protect at least one of the protrusion and/or the operating button from abrasion.

As already indicated above, the supply device may, preferably, comprise a robotic arm. As a consequence thereof, the protrusion can be arranged at the robotic arm, in particular by mounting the protrusion to the robotic arm or by forming the protrusion at the robotic arm. Specifically, the robotic arm may comprise a gripping device. The term "gripping device" as used herein is a broad term and is to be given its ordinary and customary meaning to a person of ordinary skill in the art and is not to be limited to a special or customized meaning. The term may, specifically, refer, without limitation, to a mechanical element which is, typically, designed for seizing an object, transferring it to a desired location and to release the object at the desired location. With respect to the disclosure herein, the specific gripping device may, thus, be configured to grip a slide or a slide holder, to transfer it to the slide reception of the imaging device in a tight fashion, thereby avoiding an instability or a loss of the slide during transport, and to release it, preferably to a slide tray as described elsewhere herein. Herein, the protrusion may be arranged at the gripping device, thus enabling the gripping device to insert the slide into a slide reception of the imaging device and to, concurrently, press the eject button of the imaging device, resulting in an ejection of a slide tray configured to hold the slide during the scanning of the slide in the imaging device. Herein, the gripping device may, preferably, comprise a first gripping part and a second gripping part, wherein the first gripping part and the second gripping part are moveable relative to one another, in particular in a linear fashion. Herein, the first gripping part and the second gripping part can have surfaces facing one another, wherein the surfaces may be substantially plane, thus, supporting the tight grip. However, further kinds of arrangements of the protrusion may, still, be conceivable.

Further, the slide imaging apparatus may comprise at least one monitor which is configured to show at least one image, preferably a plurality of images, in a presentation which can be viewed by a user of the slide imaging apparatus. In particular, the monitor can be mounted to a pivotable holder in order to facilitate viewing of the at least one image by a user from various positions.

Further, the slide imaging apparatus can, preferably, comprise an operating system which may be configured to control the operation of at least one component of the slide imaging apparatus that may, in particular, be selected from at least one of the supply device and the at least one imaging device. For this purpose, the operating system may comprise at least one computer, at least one input device configured to input instructions to the computer and at least one display device. Herein, the input device may, preferably, comprise a keyboard. Further, the display device may, preferably, be configured to present at least one item of information related to the operational status of the slide imaging apparatus to the user. However, further information may, further, be provided.

Further, the operating system can be aware of the operational status of the at least one imaging device, wherein the operational status of the imaging device can used for determining whether the respective imaging device is available or not. The term "available" as used herein is a broad term and is to be given its ordinary and customary meaning to a person of ordinary skill in the art and is not to be limited to a special or customized meaning. The term may, specifically, refer, without limitation, to an operational status during which the corresponding imaging device is ready for scanning at least one slide. However, the operational status of the imaging device may, further assume a non-availability status, in particular during a warm-up phase or during a defect of the corresponding imaging device. For this purpose, a direct connection may be provided between an output of the imaging device and a computer on which the operating system may be running. Alternatively or in addition, the slide imaging apparatus may, further, comprise least one vision sensor configured to detect an operational status of the at least one imaging device using at least one indicator, preferably in form of one or more light emitting diodes (LEDs), configured to indicate a corresponding operational status of the imaging device.

Further preferred arrangements of the slide imaging apparatus may be conceivable. Accordingly, the slide imaging apparatus may, further, comprise a frame, particularly a frame having wheels, and at least one plate connected to the frame, wherein the at least one imaging device may be arranged on the at least one plate. Herein, the at least one plate may be extendable from the frame independently from another plate, thus, improving access to each imaging device for service personnel. However, the plates may be dispensable in an embodiment in which the at last one imaging device may be considered as too delicate to be moved. Preferably, two or more imaging devices can be arranged in an adjacent manner with respect to each other, especially one above the other in a vertical fashion or, as an alternative, next to each other in a horizontal fashion. In general, an adjacent arrangement of the at least two imaging devices may facilitate reaching the second imaging devices by the robotic arm of the supply device. Further, the slide imaging apparatus may comprise a table, wherein at least the storage device and the supply device can be mounted to the table. Further, the slide imaging apparatus may comprise a housing at least partially encompassing the supply device, wherein the housing can comprise a safety door and a safety switch configured to detect a state of the safety door. Further, the slide imaging apparatus can comprise an emergency stop switch and, in addition, an emergency stop button, wherein the emergency stop switch can be operable using the emergency stop button. For additional details concerning further preferred arrangements of the slide imaging apparatus, reference can be made to the embodiments as disclosed below.

Further disclosed and proposed herein is a method for imaging a plurality of slides, wherein the method comprises the following steps:

loading a plurality of slides into a storage device and storing the slides in the storage device;

supplying the slides from the storage device to an imaging device using a supply device, whereby the supply device concurrently presses an operating button of the imaging device; and generating an image of a sample mounted on the slide using the imaging device.

In particular, the method may commence with step a), whereinafter steps b) and c) can, consecutively, be repeated for any or, preferably, all slides as provided in step a). For this purpose, the slides may be supplied from the storage device in an automated fashion to the imaging device for generating the desired image of the sample.

In addition, a further step d) may be performed as follows: conveying the slides from the imaging device to the storage device.

As already indicated, the slides may, particularly, be conveyed to associated positions within the storage device into which the slides have been loaded. In other words, the slides may be conveyed to the same positions within the storage device into which the slides had been loaded before they were supplied from the storage device to the at least one first imaging device or to the at least one second imaging device.

For further details concerning the method for imaging a plurality of slides, reference may be made to the slide imaging apparatus as described elsewhere herein.

Further disclosed and proposed herein is a computer program including computer-executable instructions for performing the method according to the present invention in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps a) to d) as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the specimens and/or certain aspects of performing the actual measurements.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

Advantageously, the slide imaging apparatus and the method for imaging a plurality of slides enable improved processing of the slides to be processed in an imaging device, wherein the slides are provided to be introduced into a slide reception of an imaging device. In particular, they enable inserting the slides into a slide reception of an imaging device and, concurrently, pressing an eject button of the imaging device, especially to eject a slide tray configured to hold the slide or a slide holder during the scanning of the slide in the imaging device.

Summarizing and without excluding further possible embodiments, the following embodiments may be envisaged:

A slide imaging apparatus, comprising
at least one imaging device configured to generate an image of a sample mounted on a slide, wherein the imaging device comprises at least one operating button;
a storage device loadable with a plurality of slides and configured to store the slides; and
a supply device configured to supply the slides from the storage device to the imaging device, wherein the supply device is configured to press the operating button.

The slide imaging apparatus according to Embodiment 1, wherein the supply device comprises a protrusion configured to press the operating button.

The slide imaging apparatus according to Embodiment 2, wherein the protrusion is lance-shaped or finger-shaped.

The slide imaging apparatus according to Embodiment 2 or 3, further comprising a protective cover configured to cover the protrusion.

The slide imaging apparatus according to Embodiment 4, wherein the protective cover is configured to protect at least one of the protrusion and the operating button.

The slide imaging apparatus according to any one of Embodiments 1 to 5, wherein the supply device comprises a robotic arm.

The slide imaging apparatus according to Embodiment 6, wherein the protrusion is arranged at the robotic arm.

The slide imaging apparatus according to Embodiment 7, wherein the protrusion is mounted to or formed at the robotic arm.

The slide imaging apparatus according to any one of Embodiments 6 to 8, wherein the robotic arm comprises a gripping device configured to grip a slide or a slide holder.

The slide imaging apparatus according to Embodiment 9, wherein the protrusion is arranged at the gripping device.

The slide imaging apparatus according to Embodiment 9 or 10, wherein the gripping device comprises a first gripping part and a second gripping part.

The slide imaging apparatus according to Embodiment 11, wherein the first gripping part and the second gripping part are moveable relative to one another.

The slide imaging apparatus according to Embodiment 12, wherein the first gripping part and the second gripping part are linearly moveable relative to one another.

The slide imaging apparatus according to any one of Embodiments 11 to 13, wherein the first gripping part and the second gripping part have surfaces facing one another.

The slide imaging apparatus according to Embodiment 14, wherein the surfaces are substantially plane.

The slide imaging apparatus according to any one of Embodiments 1 to 15, wherein the operating button is located on a surface of the imaging device and is accessible to be pressed or released, whereby a piece of information is transmitted to the imaging device to execute an operation of the imaging device.

The slide imaging apparatus according to any one of Embodiments 1 to 16 wherein the operating button is or comprises an eject button.

The slide imaging apparatus according to Embodiment 17, wherein the imaging device is configured to eject a slide tray when the eject button is pressed.

The slide imaging apparatus according to any one of Embodiments 1 to 18, wherein the supply device is further configured to convey the slides from the at least one imaging device to the storage device.

The slide imaging apparatus according to Embodiment 19, wherein the supply device is configured to convey the slides from the at least one imaging device to the storage device to associated positions within the storage device into which the slides have been loaded.

The slide imaging apparatus according to any one of Embodiments 1 to 20, wherein the storage device is loadable with slide holders, wherein the slide holders are configured to hold more than one slide.

The slide imaging apparatus according to Embodiment 21, wherein the storage device is manually loadable with the plurality of the slides or of the slide holders.

The slide imaging apparatus according to Embodiment 21 or 22, wherein the storage device is configured to store the slides or the slide holders in rows next to each other.

The slide imaging apparatus according to any one of Embodiments 21 to 23, wherein the storage device comprises a rack configured to be loaded with the slides or the slide holders.

The slide imaging apparatus according to any one of Embodiments 1 to 24, further comprising a fast lane configured to charge the imaging device with at least one sample mounted to a designated slide determined for privileged processing.

The slide imaging apparatus according to any one of Embodiments 1 to 25, wherein the imaging device is selected from a 2D camera or a line scan detector.

The slide imaging apparatus according to any one of Embodiments 1 to 26, comprising at least two imaging devices.

The slide imaging apparatus according to Embodiment 27, wherein the supply device is configured to selectively supply the slides from the storage device to one of the at least two imaging devices.

The slide imaging apparatus according to any one of Embodiments 1 to 28, further comprising a frame, particularly a frame having wheels, and a table.

The slide imaging apparatus according to Embodiment 29, wherein at least the storage device and the supply device is mounted to the table.

The slide imaging apparatus according to any one of Embodiments 1 to 30, further comprising an operating system configured to control operation of at least one of the supply device and the imaging device.

The slide imaging apparatus according to Embodiment 31, wherein the operating system comprises at least one computer, at least one input device configured to input instructions to the computer and at least one display device.

The slide imaging apparatus according to Embodiment 32, wherein the input device comprises a keyboard.

The slide imaging apparatus according to any one of Embodiments 1 to 33, further comprising at least one monitor configured to present images of the samples mounted on the slide after scanning by the imaging device.

The slide imaging apparatus according to Embodiment 34, wherein the at least one monitor is mounted to a pivotable holder.

The slide imaging apparatus according to any one of Embodiments 1 to 35, further comprising a housing at least partially encompassing the supply device.

The slide imaging apparatus according to Embodiment 36, wherein the housing comprises a safety door and a safety switch configured to detect a state of the safety door.

The slide imaging apparatus according to any one of Embodiments 1 to 37, further comprising an emergency stop switch.

The slide imaging apparatus according to Embodiment 38, further comprising an emergency stop button.

The slide imaging apparatus according to Embodiment 39, wherein the emergency stop switch is operable using the emergency stop button.

The slide imaging apparatus according to any one of Embodiments 1 to 40, wherein the imaging device comprises an indicator configured to indicate an operational status of the imaging device.

The slide imaging apparatus according to Embodiment 41, wherein the indicator comprises at least one light emitting diode (LED).

The slide imaging apparatus according to Embodiment 41 or 42, wherein the slide imaging apparatus further comprises at least one vision sensor configured to detect an operational status of the imaging device using the indicator.

A method for imaging a plurality of slides, comprising the steps:
- loading a plurality of slides into a storage device and storing the slides in the storage device;
- supplying the slides from the storage device to an imaging device using a supply device, whereby the supply device concurrently presses an operating button of the imaging device; and
- generating an image of a sample mounted on the slide using the imaging device.

The method according to Embodiment 44, wherein the supply device comprises a protrusion, wherein the protrusion presses the operating button.

The method according to any one of Embodiments 44 or 45, further comprising the following step:
- wherein the slides are conveyed from the imaging device to the storage device.

The method according to Embodiment 46, wherein the slides are conveyed to associated positions within the storage device into which the slides have been loaded.

BRIEF DESCRIPTION OF THE DRAWINGS

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

In the Figures.

DETAILED DESCRIPTION

Figure 1:
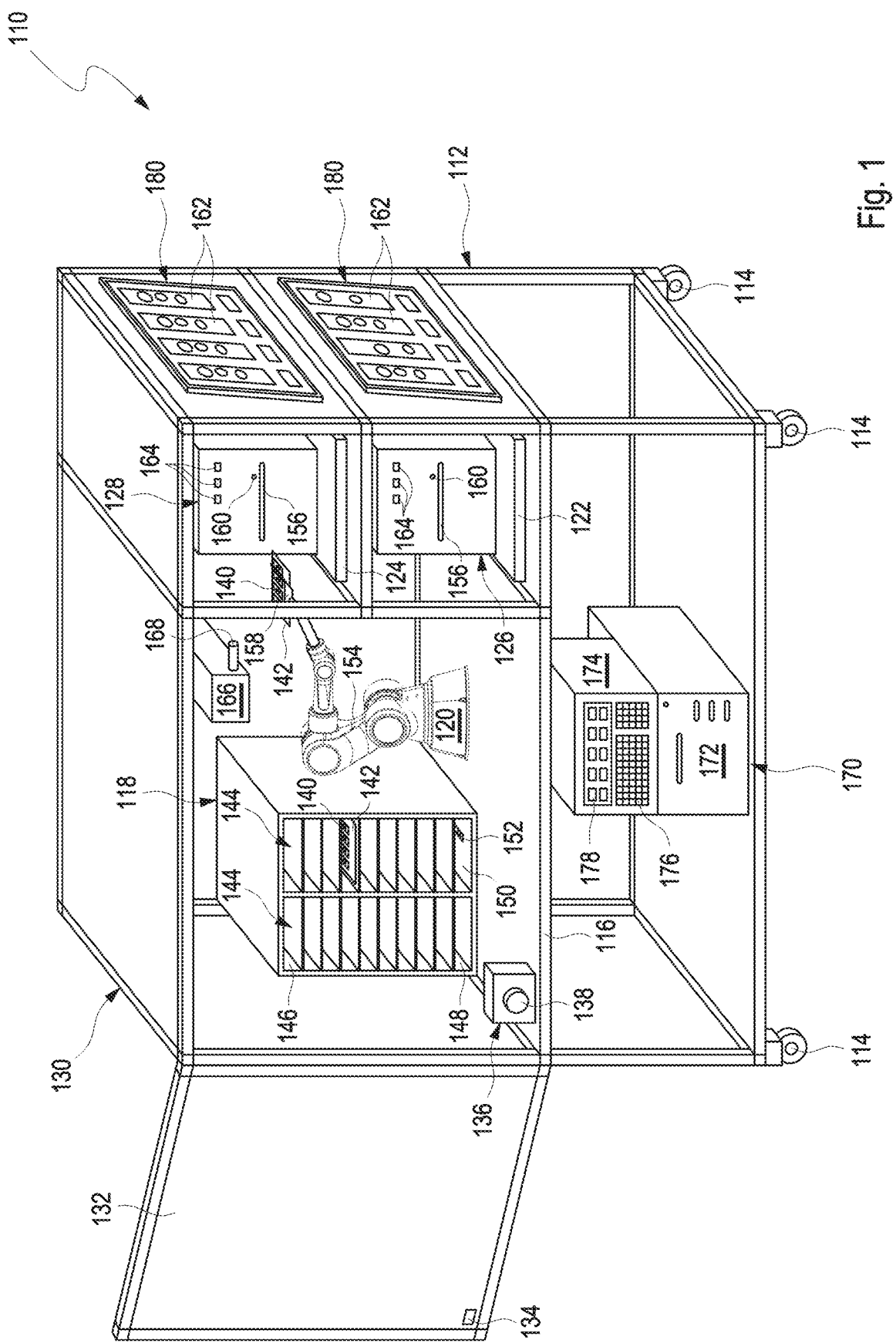
FIG. 1 schematically illustrates a preferred embodiment of a slide imaging apparatus according to the present disclosure in a side view.

FIG. 1 schematically illustrates a preferred embodiment of a slide imaging apparatus 110 according to the present disclosure in a side view. As shown in FIG. 1, the slide imaging apparatus 110 may, preferably, comprise a frame 112, wherein the frame 112 may, in particular, comprise wheels 114, thus, enabling the slide imaging apparatus 110 to be moved to a desired location. As further depicted in FIG. 1, the frame 112 further comprises a table 116, wherein at least a storage device 118 and a supply device 120 are mounted to the table 116. However, further kinds of arrangements for the storage device 118 and for the supply device 120 may also be conceivable.

Further according to the embodiment as illustrated in FIG. 1, a first plate 122 and a second plate 124 are connected to the frame 112, wherein a first imaging device 126 is arranged on the first plate 122, while a second imaging device 128 is arranged on the second plate 124. Further embodiments of the slide imaging device 110 (not depicted here) comprising a single imaging device only or three, four, five, six, or more individual imaging devices may also be feasible, wherein the at least one imaging device 126, 128 can be individually addressed by the supply device 120 as disclosed above or below in more detail. As a result of the particular arrangement as shown in FIG. 1, the first imaging device 126 and the second imaging device 128 are arranged one above the other. However, further kinds of arrangements for the first imaging device 126 and for the second imaging device 128 may also be conceivable, in particular as long as they can be reached by the supply device 120. In addition, the first plate 122 and the second plate 124 may, preferably, be extendable from the frame 112, especially by using telescopic rails (not depicted here), in an independent fashion, in particular for facilitating access in the event of a service case. In this embodiment, an exact positioning can, preferably, be achieved by depressions in the plates 122, 124 which are designed for receiving a respective base of the imaging devices 126, 128, respectively. However, further kinds of arrangements may also be feasible.

As further depicted in FIG. 1, the slide imaging apparatus 110 according to the present embodiment comprises a housing 130, which at least partially encompasses the supply device 120, thus, supporting an undisturbed operation of the supply device 120. As schematically illustrated in FIG. 1, the housing 130 has a safety door 132 and a safety switch 134, wherein the safety switch 134 is configured to detect a state of the safety door 132, such as open state or a closed state of the safety door 132. However, further kinds of safety provisions may also be possible.

Further, the embodiment of the slide imaging apparatus 110 as depicted in FIG. 1, comprises an emergency stop switch 136, wherein the emergency stop switch 136 is operable here using an emergency stop button 138. However, further kinds of emergency provisions may also be feasible. Upon pressing the emergency stop button 138, the emergency stop switch 136 can induce an immediate stop of the operation of the slide imaging apparatus 110 if considered to be required by service personnel.

As schematically illustrated in FIG. 1, the storage device 118 is loadable with a plurality of slides 140 and configured to store the slides 140. In particular, the plurality of slides 140 may be manually loaded to the storage device 118. For this purpose, the storage device 118 may be loadable with at least one of individual slides and slide holders 142, wherein each slide holder 142 is configured to hold more than one slide 140. As further depicted in FIG. 1, the storage device 118 is configured to store the slides 140 or the slide holders 142, respectively, in rows 144 which are located in adjacent fashion next to each another. However, further arrangements of the storage device 118 may also be conceivable.

In general, the supply device 120 may be configured to process the slides 140 or the slide holders 142, respectively, along a predetermined routine route, for example, starting on a top row 146 and continuing to a bottom row 148 of the storage device 118. In a particular embodiment as depicted here, the storage device 118 may comprise a fast lane 150, wherein the fast lane 150 may be configured to store at least one sample mounted to a designated slide 152, wherein each designated slide 152 as located in the fast lane 150 is determined for privileged processing outside the predetermined routine route as normally used by the supply device 120.

As further schematically illustrated in FIG. 1, the supply device 120 may be configured to selectively supply the slides 140 from the storage device 118 to the first imaging device 126 or to the second imaging device 128. In a particularly preferred embodiment, the supply device 120 may be configured to automatedly supply the slides 140 from the storage device 120 selectively to the first imaging device 126 or to the second imaging device 128.

Figure 3:
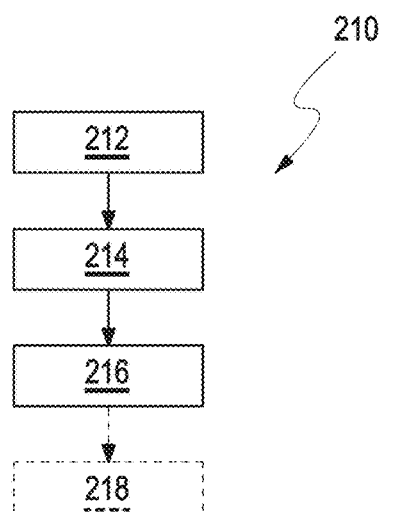
FIG. 3 schematically illustrates a preferred embodiment of a method for imaging a plurality of slides according to the present disclosure.

As schematically depicted there, the supply device 120 may comprise a robotic arm 154 which may, especially, be configured for introducing the slide 140 to a slide reception 156, in particular a slit, as comprised by each of the first imaging device 126 and the second imaging device 128, wherein the slide reception 156 is configured to receive the slide 140 for imaging purposes. As illustrated in FIG. 3 below in more detail, the robotic arm 154 may comprise a gripping device 158 which is configured to grip the slide 140 or the holder 142, respectively. More particular, the gripping device 158 may have a protrusion (not depicted here), especially a lance-shaped or finger-shaped protrusion, which is configured to press an operating button 160 of the first imaging device 126 or of the second imaging device 128. However, a further kind of arrangement of the supply device 120 may, still, be possible.

In addition, the supply device 120 may be configured to convey the slides 140 back from the first imaging device 126 or from the second imaging device 128 after scanning to the storage device 118. Thereafter, the slides 140 can be removed in a manual fashion from the storage device 118, thus, providing space for further slides 140. In particular, the supply device 120 can be configured to convey the slides 140 back from the first imaging device 126 or from the second imaging device 128 to the storage device 118 to associated positions within the storage device 118 into which the slides 140 have previously been loaded prior to scanning. As a result thereof, a user can receive back the slides 140 in the same order in which they had been provided to the storage device 118.

As already indicated above, the exemplary slide imaging apparatus 110 as illustrated in FIG. 1 comprises the first imaging device 126 and the second imaging device 128, wherein each of the imaging devices 126, 128 is configured to generate an image 162 of a sample mounted on the slide 140. For this purpose, each of the imaging devices 126, 128 may, preferably, be selected from a 2D camera or a line scan detector. However, further kinds of imaging devices may also be feasible.

In a particular embodiment, at least one of the first imaging device 126 and the second imaging device 128 may comprise at least one indicator, preferably in form of one or more LEDs 164, which are configured to indicate an operational status of the first imaging device 126 or the second imaging device 128, respectively. In this particular embodiment, the slide imaging apparatus 110 may, as depicted in FIG. 1, further comprise at least one vision sensor 166 which is configured to detect an operational status of at least one of the first imaging device 126 and the second imaging device 128 using an indication as provided by the indicator, in particular by the one or more LEDs 164. For this purpose, the vision sensor 166 may comprise an optical recording device 168 as schematically depicted in FIG. 1. In a further embodiment (not depicted here), the slide imaging apparatus 110 may comprise at least two individual vision sensors 166, wherein each individual vision sensor 166 may comprise an individual optical recording device 168, wherein each individual optical recording device 168 may be assigned to detect the operational status of an individual imaging device 126, 128. However, further embodiments are still feasible.

In this manner, the slide imaging apparatus 110 may have independent access to the operational status of the first imaging device 126 or the second imaging device 128, respectively, without being required to get this piece of information from the first imaging device 126 and the second imaging device 128 in a direct fashion. However, a direct communication between the first imaging device 126 or the second imaging device 128, on one hand, and an operating system 170, on the other hand, for providing the operational status of the first imaging device 126 and the second imaging device 128 may also be feasible.

As indicated above, the slide imaging apparatus 110 may comprise an operating system 170 which can be configured to control the operation of one or more of the supply device 120, the first imaging device 126 and the second imaging device 128. Herein, the operating system 170 may, preferably, comprise a computer 172, an input device 174 configured to input instructions to the computer 170, wherein the input device 174 may comprise a keyboard 176, and at least one display device 178. Herein, the display device 178 can be used for displaying at last one item of information related to the operational status of the slide imaging apparatus 110.

Further, the slide imaging apparatus 110 may comprise at least one monitor 180, which may preferably be mounted to a pivotable holder (not depicted here) in order to facilitate viewing the images 162 of the samples mounted on the slide 140 after being scanned by the first imaging device 126 or by the second imaging device 128 by a user from various positions.

Figure 2:
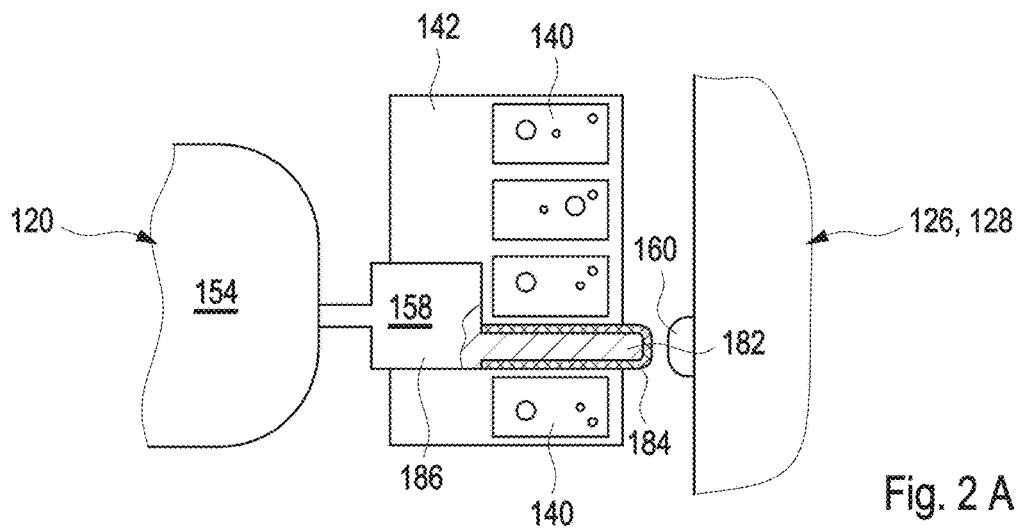
FIGS. 2A and 2B schematically illustrate a portion of a preferred embodiment of a supply device as comprised by the slide imaging apparatus according to the present disclosure in a top view (FIG. 2A) and in a side view (FIG. 2B)
Figure 2:
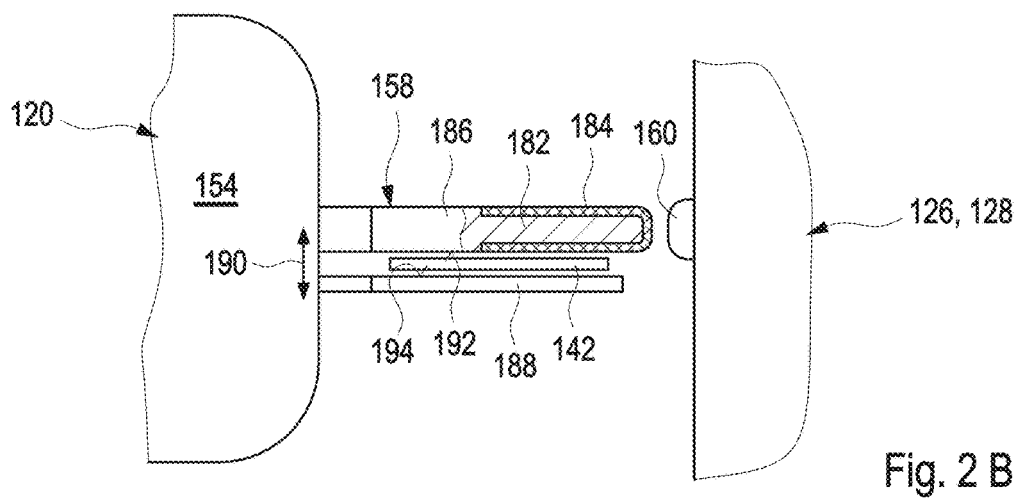

FIGS. 2A and 2B schematically illustrate a portion of a preferred embodiment of the supply device 120 as comprised by the slide imaging apparatus 110. Herein, FIG. 2A displays a top view while FIG. 2B shows a side view thereof.

Accordingly, the robotic arm 154 as comprised by the supply device 120 has a protrusion 182 which is arranged at the robotic arm 154. In general, the protrusion 182 can be mounted to or formed at the robotic arm 154 in any conceivable fashion. In the exemplary embodiment as illustrated in FIGS. 2A and 2B, the robotic arm comprises the gripping device 158 which is configured to grip the slide holder 142, wherein the slide holder 142 is configured to hold the plurality of slides 140 as depicted there, wherein the protrusion 182 is arranged at the gripping device 158. However, further arrangements of the protrusion 182 at the supply device 120 are feasible.

The protrusion 182 as comprised by the supply device 120, specifically by the gripping device 158, is a configured to press the operating button 160 of the imaging device 126, 128. For this purpose, the protrusion 182 may, preferably, be lance-shaped or finger-shaped. The operating button 160 may be or comprise an eject button, wherein the imaging device 126, 128 may be configured to eject a slide tray (not depicted here) when the eject button is pressed. Herein, the slide tray may be configured to hold the slides 140 or the slide holder 142, respectively, during the scanning of the at least one slide 140.

Consequently, the operating button 160 is impinged by the protrusion 182 at various events, which may result in an abrasion of the protrusion 182 and/or the operating button 160. Thus, as further illustrated in FIGS. 2A and 2B, a protective cover 184 may be provided, wherein the protective cover 184 may be configured to cover the protrusion 182, wherein a shape of the protective cover 184 may, preferably, be formed to cover the lance-shaped or finger-shaped protrusion 182 in a tight fashion. As a result, the protective cover 184 may, in particular, be configured to protect the protrusion 182 and/or the operating button 160.

As further illustrated in FIGS. 2A and 2B, the gripping device 158 may comprise a first gripping part 186 and a second gripping part 188, wherein the first gripping part 186 and the second gripping part 188 may be moveable relative to one another as indicated by an arrow 190, in particular in a linear fashion relative to one another. Further, the first gripping part 186 and the second gripping part 188 may have surfaces 192, 194 facing one another, wherein the surfaces 192, 194 may, preferably, be substantially plane, thus, being adopted to adjacent surfaces of the slide 140 or the slide holder 142, respectively. In this fashion, the gripping device 158 may be capable of transferring the slide 140 or the slide holder 142 to the slide reception 156 of the imaging device 126, 128 in a tight fashion, thereby avoiding an instability or a loss of the slide 140 or the slide holder 142, respectively, during transport.

FIG. 3 schematically illustrates a preferred embodiment of a method 210 for imaging a plurality of slides 140, wherein the method 210 comprises the following steps.

In a loading step 212 according to step a), a plurality of slides 140 is loaded into the storage device 118 and stored by the storage device 118. Herein the slides 140 may be loaded as individual slides 140 or by using a slide holder 142 configured to hold more than one slide 140.

In a supplying step 214 according to step b), the slides 140 are supplied from the storage device 118 to the imaging device 126, 128 by using the supply device 120. Herein, the slides 140 are, preferably, supplied in an automated fashion from the storage device 118 to the imaging device 126, 128. In addition, the supply device 120 concurrently presses the operating button 160 of the imaging device 126, 128, whereby a slide tray configured to hold the slides 140 or the slide holder 142, respectively, during the scanning of the at least one slide 140 are ejected.

In an imaging step 216 according to step c), an image of a sample mounted on the slide 140 is generated using the imaging device 126, 128. The image 162 may then be displayed on the monitor 180 as described above.

In a conveying step 218, the slides 140 may be conveyed from the imaging device 126, 128, as individual slides 140 or by using a slide holder 142 configured to hold more than one slide 140, to the storage device 118, in particular, to associated positions within the storage device 118 into which the slides 140 or the slide holder have been loaded, respectively.

For further details concerning the method 210 for imaging a plurality of slides 140 reference may be made to the slide imaging apparatus 110 as described above.

| List of Some of the Reference Numbers | |
|---|---|
| 110 | slide imaging apparatus |
| 112 | frame |
| 114 | wheel |
| 116 | table |
| 118 | storage device |
| 120 | supply device |
| 122 | first plate |
| 124 | second plate |
| 126 | first imaging device |
| 128 | second imaging device |
| 130 | housing |
| 132 | safety door |
| 134 | safety switch |
| 136 | emergency stop switch |
| 138 | emergency stop button |
| 140 | slide |
| 142 | slide holder |
| 144 | row |
| 146 | top row |
| 148 | bottom row |
| 150 | fast lane |
| 152 | designated slide |
| 154 | robotic arm |
| 156 | slide reception |
| 158 | gripping device |
| 160 | operating button |
| 162 | image |
| 164 | light emitting diode (LED), |
| 166 | vision sensor |
| 168 | optical recording device |
| 170 | operating system |
| 172 | computer |
| 174 | input device |
| 176 | keyboard |
| 178 | display |
| 180 | monitor |
| 182 | protrusion |
| 184 | protective cover |
| 186 | first gripping part |
| 188 | second gripping part |
| 190 | arrow |
| 192 | surface |
| 194 | surface |
| 210 | method for imaging a slide |
| 212 | loading step |
| 214 | supplying step |
| 216 | imaging step |
| 218 | conveying step |

What is claimed is:

1. A slide imaging apparatus, comprising:
   at least one imaging device configured to generate an image of a sample mounted on a slide, wherein the imaging device comprises an operating button;
   a storage device loadable with a plurality of slides and configured to store the slides; and
   a supply device configured to supply the slides from the storage device to the imaging device, wherein the supply device comprises a protrusion configured to press the operating button.

2. The slide imaging apparatus according to claim 1, wherein the protrusion is lance-shaped or finger-shaped.

3. The slide imaging apparatus according to claim 2, further comprising a protective cover configured to cover the protrusion.

4. The slide imaging apparatus according to claim 3, wherein the protective cover is configured to protect at least one of the protrusion and the operating button.

5. The slide imaging apparatus according to claim 1, wherein the supply device comprises a robotic arm.

6. The slide imaging apparatus according to claim 5, wherein the protrusion is arranged at the robotic arm.

7. The slide imaging apparatus according to claim 1, wherein the operating button is an eject button, wherein the imaging device is configured to eject a slide tray in response to the eject button being pressed.

8. The slide imaging apparatus according to claim 1, wherein the supply device is further configured to convey the slides from the imaging device to the storage device.

9. The slide imaging apparatus according to claim 1, further comprising an operating system configured to control operation of at least one of the supply device and the imaging device.

10. A slide imaging apparatus, comprising:
- at least one imaging device configured to generate an image of a sample mounted on a slide, wherein the imaging device comprises an operating button;
- a storage device loadable with a plurality of slides and configured to store the slides; and
- a supply device configured to supply the slides from the storage device to the imaging device, wherein the supply device is configured to press the operating button,
- wherein the supply device comprises a robotic arm,
- wherein the robotic arm comprises a gripping device configured to grip at least one of the slides or a slide holder configured to hold more than one slide.

11. The slide imaging apparatus according to claim 10, wherein a protrusion is arranged at the gripping device.

12. The slide imaging apparatus according to claim 10, wherein the gripping device comprises a first gripping part and a second gripping part, wherein the first gripping part and the second gripping part are moveable relative to one another.

13. A method for imaging a plurality of slides, comprising:
- loading a plurality of slides into a storage device and storing the slides in the storage device;
- supplying the slides from the storage device to an imaging device using a supply device, whereby the supply device presses an operating button of the imaging device concurrently with the supplying the slides; and
- generating an image of a sample mounted on the slide using the imaging device,
- wherein the supply device comprises a protrusion, configured to press the operating button.

14. The method according to claim 13, wherein the supply device comprises a robotic arm.

15. The method according to claim 14, wherein the protrusion arranged at the robotic arm that is configured to press the operating button.

16. The method according to claim 14, wherein the robotic arm comprises a gripping device configured to grip a slide and a protrusion arranged at the gripping device.

17. The method of claim 13, further comprising ejecting a slide tray in response to the operating button being pressed.

18. A slide imaging apparatus, comprising:
- at least one imaging device configured to generate an image of a sample mounted on a slide, wherein the imaging device comprises an operating button;
- a storage device loadable with a plurality of slides and configured to store the slides; and
- a supply device configured to supply the slides from the storage device to the imaging device, the supply device comprising a robotic arm having a protrusion configured to press the operating button.

* * * * *